United States Patent [19]
Colombi et al.

[11] 3,913,208
[45] Oct. 21, 1975

[54] PROCESS FOR PRODUCING BIMETALLIC AND POLYMETALLIC BODIES IN WHICH THE METALLIC COMPONENTS ARE JOINED TOGETHER WITH METALLURGICAL BOND

[75] Inventors: Gianfranco Colombi, Rome; Mario Gabaglio; Aldo Liscia, both of Turin; Mario Boccalari, Saluggia/Vercelli, all of Italy; John M. Siergiej, Wayland, Mass.

[73] Assignee: Comitato Nazionale per L'Energia Nucleare - CNEN, Rome, Italy

[22] Filed: Jan. 2, 1973

[21] Appl. No.: 320,196

[52] U.S. Cl. .................. 29/417; 228/131; 228/156
[51] Int. Cl. ............................................ B21d 39/04
[58] Field of Search ....... 29/480, 481, 474.3, 473.3, 29/471.3, 472.3, 471.1, 497.5, 479

[56] References Cited
UNITED STATES PATENTS
3,602,978  9/1971  Oaks .............................. 29/481 X
3,604,102  9/1971  Boccalari et al. ............... 29/479 X Primary Examiner—Andrew R. Juhasz
Attorney, Agent, or Firm—Stevens, Davis, Miller & Mosher

[57] ABSTRACT

A billet made of two or more metal masses fitted one into the other and enclosed in a vacuum tight casing is extruded through a circular die to obtain a solid multilayer bar with layers metallurgically bonded together. The bar is divided into segments. Each segment is machined to remove one layer for a first length of the segment, two layers for a second length and so on until the core of the extruded bar is exposed. Thus a body is obtained made up of a number of adjoining coaxial sections with radial symmetry about the same axis, the peripheral portion of each section being made of a metal different from the adjoining sections.

2 Claims, 6 Drawing Figures

PROCESS FOR PRODUCING BIMETALLIC AND POLYMETALLIC BODIES IN WHICH THE METALLIC COMPONENTS ARE JOINED TOGETHER WITH METALLURGICAL BOND

The object of this invention is a method for producing metal bodies made up of two or more adjoining sections all having radial symmetry about the same axis, of which sections the peripheral layers are made of metals which are different one section from the adjoining ones, which metals are bonded to one another through a metallurgical bond. An essential requirement for obtaining a metallurgical bond between two metals is that the two metals have reciprocal metallurgical affinity. Two metals which in their pure state or alloyed show a metallurgical affinity between them are, for instance, zirconium and iron or their alloys.

In the nuclear technology, particularly, the use of a material such as zirconium and its alloys of low neutron absorption and high cost is advantageously restricted to that area within a reactor where the nuclear reaction takes place, that is the reaction core, while other structural materials of lower cost, such as iron and its aloys, are used in those areas outside of the core.

This is the case with those nuclear reactors wherein the fuel rods consist of a tube made of zirconium or its alloys and containing the fissible material which tube is fitted between header plates made of iron or its alloys. Because each fuel rod terminates into a plug made of zirconium or its alloys which is leakproof connected to the zirconium tube, the problem arises of further connecting said zirconium plugs to the header plates which are made of an iron alloy.

An acutal bonding or uninterrupted connection of the parts to be connected is preferable to a mechanical connection. However, as known, an ordinary joint between zirconium and an iron alloy, e.g., stainless steel, when such a joint is achieved with methods causing the melting of the two metals, does not give satisfactory results in as much as it produces large volumes of intermetallic compounds which, by their naature, are fragile and therefore are liable to impair the mechanical strength and resistance to corrosion of the joint.

According to the process of this invention, an uninterrupted connection is achieved of two component elements made of metals which are different from one another but show metallurgical affinity for one another; specifically such plugs can be produced thereby which are adapted for effecting an uninterrupted connection between a fuel tube and the related header plate.

A plug manufactured according to the method of this invention comprises two cylindrical sections of different diameter the smaller diameter section being made of zirconium and dimensioned to fit into the fuel tube, the larger diameter section being made of stainless steel with a zirconium core and dimensioned to fit into a corresponding bore through the header plate.

The connection between the smaller section of the plug and the tube and between the larger section and the plate can be effected by conventional means such as by welding.

The method of this invention is based on the coextrusion of metal components which have been previously brought to their plastic state. A technique of this kind has been disclosed in the U.S. Pat. No. 3,604,102 of which the object is a method for producing tubular joints between tubular metal components having metallurgical affinity for one another.

Such method consists of a number of successive process steps comprising mainly the extrusion of a double layer billet for obtaining a double layer tube; forming the tube to produce necks along it and partially removing the tube outer layer transversely exceeding said necks.

The process of this invention differs from the above patent both for the billet configuration and for the various process steps undergone by the billet after the extrusion.

According to the process of this invention a billet is prepared comprising two or more coaxial components of which the innermost is a solid cylinder which is surrounded by a first tubular element and, if so desired, by further tubular elements said elements, fitted one into the other, being eventually enclosed and sealed in a casing made of malleable matel wherein a vacuum is produced.

The billet so obtained is then heated to bring it to a plastic state and subsequently extruded to obtain a solid coextruded cylindrical bar in which the radial symmetry of the starting billet cross section is preserved, and which consists of a core made of one metal and of an outer layer of the other metal said core and layer being bonded at the interface between them.

The coextruded cylindrical bar is then machined and finished to free it from the malleable casing. The bar is then cut through into a plurality of segments of same length, which length is at least equal to the length of the composite body to be produced as a final product of the process.

Each segment is then machined to obtain the desired composite body.

To achieve this the metal mass comprising the peripheral layer of the segment is totally removed for a length thereof. In this way a segment is obtained made up of two sections one section of smaller diameter being made of a first metal and the other section of larger diameter being made of a second metal but having a core of the first metal. The boundary or interface between the two metals being located on a cylindrical surface of which the cross section is a geometrical figure with radial symmetry of which the inscribed circle has a larger diameter than the smaller section of the bar; said cylindrical surface being defined by two planes perpendicular to the generatrices of the cylindrical surface one at one end of the segment and the other between said two sections of the segment.

When a plug is to be produced with more than two metals, which will be called polymetallic plug, the process is the same as with a bimetallic plug, however the billet components are as many as the plug components and all consist of tubular elements coaxially fitted one into the other except for the innermost which is a solid cylinder or a solid prism. The machining operation subsequent to the billet extrusion and cutting the extruded bar into segments is intended in this case for exposing each component for a length of each segment. Bimetallic plugs can also be produced by the process of this invention wherein the billet core, made of one of the two metals, is surrounded by a layer of the other metal which is further surrounded by a layer of said one metal.

The main object of this invention is to provide an improved process for producing bimetallic or polymetallic plugs with radial symmetry in which plugs the component metals are metallurgically bonded one to another along their interfaces that is the boundary surfaces — generally cylindrical — between a pair of said metals.

A second object of this invention is to provide a process for producing bimetallic and polymetallic plugs through coextrusion of metal masses previously brought to a plastic state and enclosed in a vacuum tight casing.

One advantage of the process of this invention is that the plugs produced thereby are made of different metal masses effectively bonded together with a metallurgical bond which does not impair the mechanical properties of the starting metals.

Another advantage of the process of this invention is that the area of the interface area that is the transition area between the bonded metal masses can be predetermined at will to meet the design requirements.

Further advantages of this invention will become apparent from the following description and from the drawings which illustrate a preferred embodiment of the invention as a non-limitative example thereof.

Figure 1:
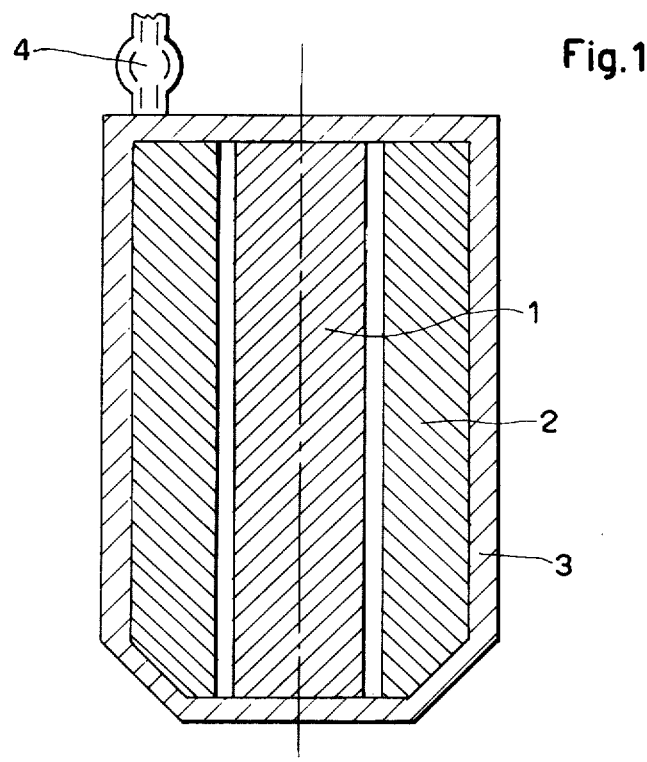
FIG. 1 shows a longitudinal section of a billet comprising two coaxial components encased in an outer jacket.

For clarity sake the following detailed description will deal only with the production of bimetallic plugs the necessary adaptation of this process to the production of polymetallic plugs being considered obvious.

With reference to the drawings, the process for producing bimetallic plugs with radial symmetry comprises the following steps: preparing the billet and the casing, degreasing and cleaning them, enclosing and vacuum sealing the billet in the casing, extruding, cutting the extruded bar into segments, machining the segments.

By the first step the billet is prepared comprising two metal blocks 1 and 2 of substantially the same length each being made of a metal which shows metallurgical affinity for the metal of the other block, the two metals being also compatible with one the other from the point of view of the extrusion operation, that is adapted for being extruded together to form a coextruded bar.

Block 2 of said two blocks has tubular form for receiving block 1 thereinto which has preferably a cylindrical or prismatical solid form. Besides a cylindrical casing 3 made of malleable metal is prepared for enclosing said blocks thereinto and forming a jacketed billet. Specifically, as a non-limitative example, the inner block can be made of steel and the outer one of zirconium of its alloys and the casing of copper.

The two components 1, 2 which will be referred to as the active components of the billet after being degreased and degassed are assembled within casing 3 which is subsequently evacuated of the gases therein contained and carefully sealed to make it gastight under high vacuum, the casing being evacuated by known means through fitting 4 which is then sealed.

Figure 2:
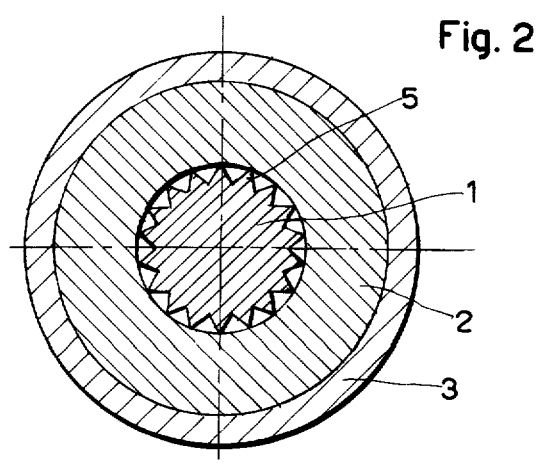
FIG. 2 shows a transverse cross-section of the cylindrical portion of the billet of FIG. 1.

With reference to FIG. 2 which shows a cross-section of the billet of FIG. 1 it is to be noted that sharp grooves or longitudinal indentations 5 can be provided on one of the two blocks specifically on the surface thereof to be joined to the other block.

This artifice which has been discussed at length in the above mentioned patent, is very useful to improve the quality of a metallurgical bond. In fact such grooves and indentations, which are provided on the surface of the harder of the two metals (steel), will cut during the extrusion step into the second softer metal (zirconium or its alloys) and instantly give rise to a fresh area of contact free from surface oxidation which are one of the most common causes of a defective metallurgical bond.

Figure 3:
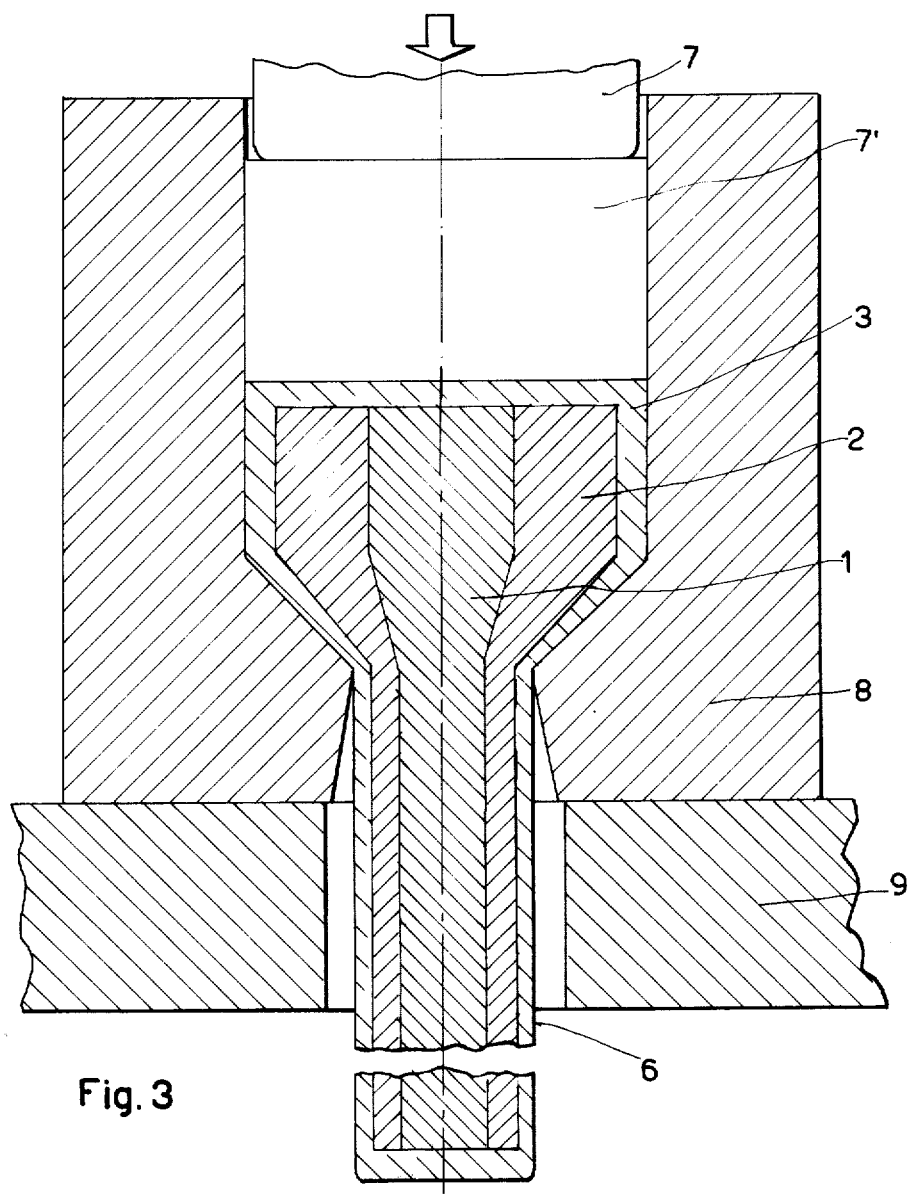
FIG. 3 illustrates an intermediate step of the extrusion operation on the billet of FIG. 1 whereby a coextruded bar is obtained.
Figure 4:
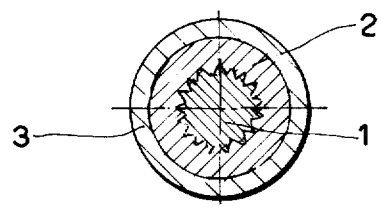
FIG. 4 is a cross-section of the coextruded bar obtained through the operation of FIG. 3.

The billet is then heated to a plastic state and maintained within a range of temperature at which the billet material and casing is in its plastic state which range, in the present case, is from 800°C to 900°C and is subsequently extruded as shown in FIG. 3 to yield the composite bar 6 shown in transverse cross-section in FIG. 4 which indicates also the penetrating effect of ridges 5. It will be appreciated that the extruder bar is still with its casing of malleable metal.

Figures 5A, 5B:
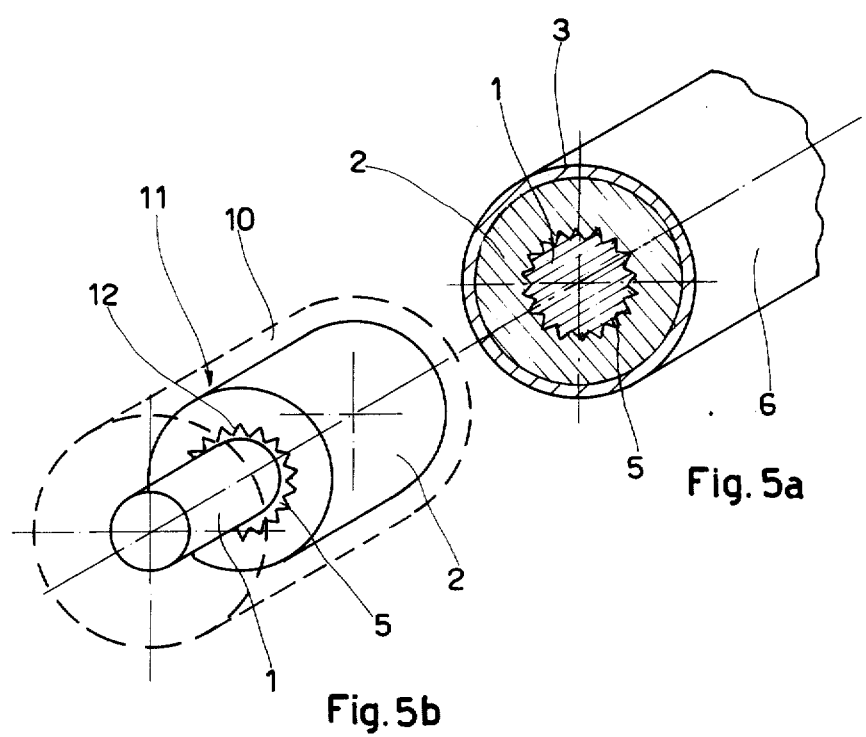
FIG. 5a is a fragmentary perspective view of a section of the coextruded bar of FIG. 4.
FIG. 5b is a perspective view of a plug obtained from the bar segment of FIG. 5a through machining and finishing the outline of the starting segment being shown by a dashed line.

A conventional metal extrusion press is employed of which in FIG. 3 only the ram 7, the mandrel 7', the container die 8 and the container die support 9 are shown. The arrow indicates the direction of ram travel. FIGS. 5a and 5b refer to the subsequent steps of cutting and machining the extruded bar 6. By these steps, the bar is divided into a number of segments 10 each of which having a length as required for obtaining the final bimetallic body 11 — specifically a plug — through machining operations only. After the machining step the final product of this process is a metal body comprising two contiguous cylindrical and coaxial sections of different diameters. The section of smaller diameter 1 being made in the present case of stainless steel only and the adjacent section of larger diameter being made of a stainless steel core 1 and of an outer layer of zirconium or its alloys; said core and outer layer being bonded together along a cylindrical corrugated surface which has the same length as the section of larger diameter of the body and which appears as a serrated line 12 on the end surfaces of said section of larger diameter, the serrated line being a cross-section of said corrugated cylindrical surface.

The above mentioned mechanical operation comprises a turning and finishing operation by which the coextruded casing 3 is first removed along the whole extruded bar. This is then cut through to obtain a number of segments of constant length adapted to meet the dimensional requirements of the final product. The outer layer 2 is then totally removed from each segment for a length thereof whereby the metal of the bar core 1 is exposed for the same length.

After this operation the bimetallic plug will be ready for being used in the manner described above that is for being welded to other metal components, each metal of the plug being welded to a component made of a metal which is weldable therewith.

Obviously other machine work can be effected on the bar section in addition to the above. For instance a bore can be provided coaxial with the plug which may be a through bore or only a cylindrical recess.

A further illustration of the quantitative aspects of the process of this invention is provided by the following non-limitative examples of which one is reported in detail and the others are summarized in Table 1.

EXAMPLE

This example refers to a cylindrical billet of the type shown by FIGS. 1 and 2 which billet is 200 mm long and has a circular cross-section of 81 mm diameter.

The two coaxial components having the same length have been fitted one into the other. The inner solid cylindrical component had a diameter of 13 mm and was made of stainless steel AISI 304L with longitudinal grooves as shown by reference numeral 5 in FIG. 2.

The other tubular component of 48 mm O D was made of zircaloy 2. 304L stainless steel has a composition of 19 percent Cr, 10 percent Ni, 0.03 percent C the remainder iron. Zircaloy 2 has a composition 0.02 Hf, 0.12 Fe, 1.46 Sn, 0.05 Ni; the remainder iron. Both the components of the billet have been enclosed in a soft iron case of which the O D was 81 mm which was subsequently evacuated to a pressure of less than $1,10^{-3}$ torr and vacuumtight sealed.

Before placing it into the vacuumtight case, the stainless steel inner component and the case have benn degreased and degassed while the zircaloy 2 outer sleeve has been degreased only.

After heating the billet for 2 hours at 900°C in a furnace, it was then extruded by the means illustrated in FIG. 3, the advancing speed of the ram 7 being eequal to 0.40 meters per minute.

The following are other conditions of the extrusion operation. The reduction ratio of the cross-section areas of the billet components before and after the extrusion was 4.9 to 1. The extruded bar O D was 36 mm and the approximate length was 1 m.

The time period from the moment when the billet was taken out of the heating furnace and the moment when the extruding ram 7 began to move was 7 seconds.

The working pressure of the press was 1.45 Kg/cm² and was maintained constant during the whole extrusion operation.

The ends of the extruded bar were cut off at right angles to the bar axis.

From the end sections and from the middle section of the extruded bar several samples were taken in the form of circular disks 10 mm thick. These disks, after polishing showed through the metallographic analysis that a continuous and uniform metallurgical bond had formed between the two metals of the bar.

Further tensile and bending tests have been performed according to the standard methods which demonstrated that the metallurgical bond between the two metals was a high quality bond.

A set of tests have been conducted with the purpose of verifying the reproducibility of the results of the process of this invention. In the following table the results are reported of said set of tests along with some of the process parameters. The results of these tests confirmed that the method of metal jointing according to the process of this invention is highly reliable.

TABLE 1

Tensile stress tests on some types of joints stainless steel-zircaloy 2

| Reference Nr. of extrusion | steel designation | Billet temperature (°C) | Reduction ratio | Test piece cross-sect. | Ultimate tensile stress (Kg/mm²) |
|---|---|---|---|---|---|
| TB-71 | AISI 304 L | 850 | 4.9 | 1 × 3.5 | 47.2 |
| | | | | 1 × 3.5 | 49.1 |
| | | | | 1 × 3.5 | 39.8 |
| TB-71/2 | AISI 304 L | 820 | 4.9 | 1 × 3.5 | 50.4 |
| | | | | 1 × 3.5 | 49.6 |
| | | | | 1 × 3.5 | 47.1 |
| TB-71/2-A | AISI 304 L | 900 | 4.9 | 1 × 3.5 | 45.4 |
| | | | | 1 × 3.5 | 35.5 |
| | | | | 1 × 3.5 | 40.9 |
| TB-71/9 | AISI 304 L | 820 | 6.5 | 1 × 3.5 | 52.6 |
| | | | | 1 × 3.5 | 50.2 |
| | | | | 1 × 3.5 | 54.3 |

Failure of test piece occurred in the Zircaloy; the joint area remained unaltered.

What is claim is:

1. A process for producing a solid metal body made up of two adjoining sections having radial symmetry about the same axis, the peripheral portion of each of said sections consisting of a metal which is different from the other section but has a metallurgical affinity therewith, one of the two metals being harder than the other, which method comprises the following steps:
   a. preparing two cylindrical blocks of substantially the same length each made of one of said metals different from the other and a cylindrical casing made of a malleable metal, one of said blocks being solid and the other being tubular with the inner diameter substantially equal to the outer diameter of the said one block, the inner diameter of said casing being substantially equal to the outer diameter of said other block;
   b. degassing and cleaning said blocks and casing;
   c. fitting said blocks one into the other to form a billet;
   d. enclosing said billet in said casing, producing a vacuum therein and sealing it vacuumtight;
   e. bringing said billet and casing to a plastic state by heating;
   f. extruding said billet through a circular die to obtain a composite cylindrical solid bar of which the inner portion or core is made of one of said metals and the outer portion is made of the other of said metals the two metals being metallurgically bonded at the boundary between said portions, said composite cylindrical body being still enclosed in said casing;

g. cutting through said extruded bar along planes perpendicular to its longitudinal axis to obtain a number of segments;

h. removing from each segment so obtained the total of said basing and from a length of the segment all the outer portion and a shallow layer of the inner portion thereof whereby an integral body is obtained which comprises two contiguous cylindrical and coaxial sections of different diameter the one with smaller diameter consisting of that metal only of which the core of said bar was made and the one with larger diameter consisting of a core of one metal and an outer layer of another metal the same as with the said extruded bar, the interface along which the two metals are bonded being cylindrical and defined at one end by the end surface of the body and at the other end by the annular end surface of the larger diameter section.

2. A process for producing bimetallic bodies as per claim 1, in which process the block made of the harder metal is provided at its side surface with a series of longitudinal sharp ridges of which the purpose is for penetrating the softer metal during the extrusion step.

* * * * *